Oct. 26, 1926.
R. A. HAISLIP
SUBMARINE CABLE
Filed March 28, 1921
1,604,282
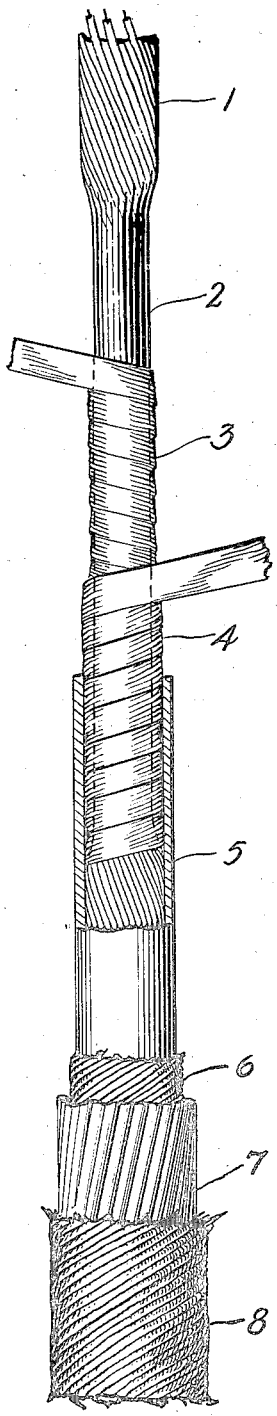
Inventor:
Richard A. Haislip,
by [signature]
Atty.

Patented Oct. 26, 1926.

1,604,282

UNITED STATES PATENT OFFICE.

RICHARD A. HAISLIP, OF MONTCLAIR, NEW JERSEY, ASSIGNOR TO AMERICAN TELEPHONE AND TELEGRAPH COMPANY, A CORPORATION OF NEW YORK.

SUBMARINE CABLE.

Application filed March 28, 1921. Serial No. 456,413.

This invention relates in general to electric cables, and more particularly to improvements in submarine cables.

It is the usual custom in submarine cables having paper or similar fibrous insulation to provide a relatively large amount of insulation which is compressed as much as is mechanically possible without injuring the insulation during the stranding process. This compact form is used in order that as much resistance as possible may be offered to the flow of water in the event of a break in the sheathing, and that the cable may therefore be taken up and repaired before a substantial length thereof is ruined.

It has previously been proposed to form a cable plug by impregnating a section of the cable core, preferably about 12 to 24 inches in length, in a sealing compound, and then subjecting this section to pressure so that the interstices are filled by the paper insulation. The value of a plug of this type in submarine cables lies chiefly in the fact that with its use a much more efficient cable can be designed and constructed for submarine use, for except at the actual plugging point, the cable can be made much less dense and therefore more efficient from a transmission standpoint than the present design.

It is an object of this invention to provide improved means for confining the core in a cable plug of this type.

In accordance with this object, the present invention contemplates binding a section of cable core which has first been impregnated in a sealing compound with elastic rubber tape so as to reduce the diameter to as small a value as possible. The core is then further bound, preferably with a fabric tape, to build up the diameter to fit the sheath snugly.

Plugs of this type will also be of considerable value in land cables as well as in submarine cables when the plugs are placed in the ends of the cables out of which wires are extended to terminals or for connection with other wires. The plugs in such cases will seal the ends of the cables so as to exclude air and moisture, which is present in air, from entering the cores of the cables and thus impairing the insulation of the wires within the cables.

The invention will be more clearly understood from a consideration of the following description taken in connection with the accompanying drawing in which conductors 1 are covered in the usual manner with paper insulating material. A section 2 of the cable core, preferably from 12 to 24 inches in length, is impregnated in any suitable moderately heavy compound preferably of such composition that it will flow freely and saturate the paper insulation at temperatures of approximately 230° F., and shall not become hard and brittle at temperatures as low as approximately 32° F.

After impregnating the section of the core which is to form the plug, this section is wrapped one or more times with elastic rubber tape 3 with sufficient tension accumulatively applied to the tape to bind the cable core into a very compact mass. By applying elastic rubber tape instead of a non-elastic tape each turn of the tape adds cumulatively to the compressive force on the core so that, within reasonable limits, any desired force can be exerted by applying more or fewer turns for compressing the core of the cable, whereas by applying a non-elastic tape the compressive force exerted by any number of turns of the tape would remain substantially the same as that caused by the tightest single turn. By applying the tape in this way, most of the sealing compound is forced out and spaces are filled by the paper insulation. The insulated conductors are, however, more securely held together by means of the small amount of sealing compound remaining.

When the core has been closely confined at this point, it is further wound with the tape 4 which may be rubber tape, rubber filled tape or impregnated tape, so as to build up the diameter to fit the sheath 5 snugly. Over the leaden sheath 5 are the usual hemp covering 6, the steel armor 7 and the outer jute covering 8. It will be seen that a cable plug produced in accordance with this invention will serve to effectively prevent the flow of water from a broken section into the adjacent section, and thereby prevent considerable loss.

What is claimed is:

1. The method of plugging a submarine cable having an outer protective sheath of uniform diameter to prevent the flow of water from a broken section into the adjacent sections which comprises impregnating a section of the cable core in a sealing compound, binding the same section of core with elastic tape so as to force out the excess compound and reduce the diameter to a value smaller than that of the adjacent portions of the core, and subsequently binding the said section of core to build up its diameter to fit the cable sheath.

2. In an electric cable having an outer protective sheath of a uniform diameter, a plurality of conductors, fibrous insulating material covering each of said conductors, a binding of elastic tape tensioned upon a section thereof and adapted through its retracting effect to hold said conductors in such close proximity that said insulating material fills substantially all the spaces therebetween, a sealing compound adapted to more effectively seal the spaces therebetween, and an outer covering wound upon said elastic tape throughout said section to build up the diameter to fit the cable sheath.

In testimony whereof, I have signed my name to this specification this 8th day of March, 1921.

RICHARD A. HAISLIP.